(12) United States Patent
Darby et al.

(10) Patent No.: US 12,254,613 B2
(45) Date of Patent: *Mar. 18, 2025

(54) SYSTEMS AND METHODS FOR INSPECTION OF IC DEVICES

(71) Applicant: Battelle Memorial Institute, Columbus, OH (US)

(72) Inventors: Nicholas Darby, Columbus, OH (US); Jeremiah Schley, Dublin, OH (US); Jeremy Bellay, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,669

(22) Filed: Feb. 14, 2024

(65) Prior Publication Data
US 2024/0185408 A1    Jun. 6, 2024

Related U.S. Application Data

(63) Continuation of application No. 17/685,837, filed on Mar. 3, 2022, now Pat. No. 11,941,797.
(Continued)

(51) Int. Cl.
*G06K 9/00* (2022.01)
*G06T 1/00* (2006.01)
*G06T 7/00* (2017.01)

(52) U.S. Cl.
CPC .......... *G06T 7/0006* (2013.01); *G06T 1/0007* (2013.01); *G06T 2207/20081* (2013.01);
(Continued)

(58) Field of Classification Search
CPC ................. G06T 7/0006; G06T 1/0007; G06T 2207/20081; G06T 2207/20084; G06T 2207/30148
(Continued)

(56) References Cited

U.S. PATENT DOCUMENTS 5,054,097 A    10/1991  Flinois et al.
6,055,055 A     4/2000  Toh
(Continued)

OTHER PUBLICATIONS

Vashistha, Nidish, et al. "Detecting hardware Trojans using combined self-testing and imaging." IEEE Transactions on Computer-Aided Design of Integrated Circuits and Systems 41.6 (2021): 1730-1743. (Year: 2021).*
(Continued)

*Primary Examiner* — Jonathan S Lee
(74) *Attorney, Agent, or Firm* — Grossman, Tucker, Perreault & Pfleger, PLLC; Donald G. Weiss (57) ABSTRACT

In an approach to non-destructive inspection of IC devices, one or more images of a Device Under Test (DUT) are received from one or more imaging devices. Observed features are detected in the one or more images and producing a first synthetic representation of a part design of the DUT that includes the observed features. The presence of one or more first unobserved features are inferred, where the one or more first unobserved features are inferred using a mapping and inference model (MIM). The one or more first unobserved features are added to the first synthetic representation of the part design of the DUT.

20 Claims, 6 Drawing Sheets

Related U.S. Application Data (60) Provisional application No. 63/156,218, filed on Mar. 3, 2021.

(52) U.S. Cl.
CPC ............... *G06T 2207/20084* (2013.01); *G06T 2207/30148* (2013.01)

(58) Field of Classification Search
USPC ......................................................... 382/141
See application file for complete search history.

(56) References Cited

U.S. PATENT DOCUMENTS

2012/0087568 A1    4/2012    Stellari
2013/0061199 A1    3/2013    Stellari et al.

OTHER PUBLICATIONS

Isola et al., "Image-to-Image Translation with Conditional Adversarial Networks", arXiv:1611.07004v3 [cs. CV], last updated Nov. 26, 2018, 17 pages.

Jionghao, "UU-Nets Connecting Discriminator and Generator for Image to Image Translation", arXiv:1904.02675v1 [cs.CV], last updated Apr. 4, 2019, 9 pages.

Karras et al., "A Style-Based Generator Architecture for Generative Adversarial Network", arXiv:1812.04948v3 [cs.NE], last updated Mar. 29, 2019, 12 pages.

International Search Report and Written Opinion of International Application No. PCT/US2022/018673, mail date Jun. 15, 2022, 9 pages.

Genssler, Paul R., and Hussam Amrouch. "Brain-inspired computing for wafer map defect pattern classification." 2021 IEEE International Test Conference (ITC), IEEE, 2021. (Year: 2021).

Barragan, Manuel J., et al. "On the limits of machine learning-based test: a calibrated mixed-signal system case study." Design, Automation & Test in Europe Conference & Exhibition (DATE), 2017. IEEE, 2017. (Year :2017).

Han, Rui, et al. "Research on transformer health condition evaluation method based on clustering analysis and dynamic feature extraction." 2020 IEEE International Conference on High Voltage Engineering and Application (ICHVE). IEEE, 2020. (Year: 2020).

\* cited by examiner

Design File     Synthetic Optical Image     True Optical Image

SYSTEMS AND METHODS FOR INSPECTION OF IC DEVICES

CROSS-REFERENCE TO RELATED APPLICATIONS

The present application is a Continuation of U.S. application Ser. No. 17/685,837, filed Mar. 3, 2022, which claims the benefit of U.S. Provisional Application Ser. No. 63/156,218, filed Mar. 3, 2021, the entire teachings of these applications is hereby incorporated herein by reference.

TECHNICAL FIELD

The present application relates generally to inspection of Integrated Circuit (IC) devices. In particular, the present disclosure relates to technologies that enable non-destructive inspection of IC devices to determine the presence of a target design.

BACKGROUND

Over the last 50 years advances in ICs have led to the production of IC devices of immense complexity and very small feature (node) size. Due to the specialized facilities and skill required to manufacture functional IC devices at advanced node sizes, modern designers of IC devices are often unable to physically manufacture their designs. Rather, such designers often outsource production of their IC designs to specialized manufacturing facilities, which may be located in a foreign country. As a result, the production of modern IC devices now often involves the use of complex, international supply chains. In the defense sector this can present a security issue, as the supply chain for producing a complex IC device may be difficult or impossible to secure using traditional defense industry solutions such as clearance and surveillance. This concern is augmented by the fact that—due to the small node sizes and complex designs involved—it can be difficult to detect whether the design of an IC was faithfully reproduced or modified during the manufacturing process.

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving.

Physical inspection of a manufactured IC device may be performed in an effort to determine whether an IC design was faithfully reproduced by a manufacturer. In many cases physical inspection involves carefully de-packaging and/or delayering an IC device and imaging the layers of the device with a scanning electron microscope. Such a process is difficult, time consuming, and expensive. Physical inspection also results in destruction of the inspected part, and thus cannot be performed on all IC devices in a batch of ICs produced by the manufacturer. As a result, physical inspection processes may not detect a modified IC device in a batch of IC devices.

A need therefore remains in the art for improved systems and methods for inspecting IC devices. The present disclosure is aimed at that need.

SUMMARY

In one illustrative embodiment, one or more images of a Device Under Test (DUT) are received from one or more imaging devices. Observed features are detected in the one or more images and producing a first synthetic representation of a part design of the DUT that includes the observed features. The presence of one or more first unobserved features are inferred, where the one or more first unobserved features are inferred using a mapping and inference model (MIM). The one or more first unobserved features are added to the first synthetic representation of the part design of the DUT.

In another illustrative embodiment, a system for non-destructive inspection of IC devices comprises: one or more controllers; one or more computer readable storage media; and program instructions stored on the one or more computer readable storage media for execution by at least one of the one or more controllers, the stored program instructions including instructions to: receive one or more images of a Device Under Test (DUT) from one or more imaging devices; detect observed features in the one or more images and producing a first synthetic representation of a part design of the DUT that includes the observed features; infer a presence of one or more first unobserved features, wherein the one or more first unobserved features are inferred using a mapping and inference model (MIM); and add the one or more first unobserved features to the first synthetic representation of the part design of the DUT.

In yet another illustrative embodiment, an apparatus for inspecting ICs, comprises: at least one imaging device configured to capture one or more images of a Device Under Test (DUT); and a controller comprising a mapping and inference model (MIM) that is configured to cause the controller to: receive one or more images of the DUT from the one or more imaging devices; detect observed features in the one or more images of the DUT and produce a first synthetic representation of a part design of the DUT, the first synthetic representation including at least the observed features; infer a presence of one or more first unobserved features based at least in part on the first synthetic representation; and generate a second synthetic representation of the part design of the DUT by adding one or more second unobserved features to the first synthetic representation of the part design.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts.

DETAILED DESCRIPTION

As used herein, the terms "lower layer" and "lower layers" refer to one or more layers proximate to the substrate of an IC device. These layers are also typically known as Front End of Line (FEOL) layers. In contrast, the terms "upper layer" and "upper layers" refer to one or more layers proximate to a top side of an IC device, i.e., the side opposite the substrate of an IC device. These layers are also typically known as Back End of Line (BEOL) layers.

As used herein the term "synthetic" refers to an output that is produced by a computer or other electronic device that applies a machine learning algorithm to convert input data to output data. For example, a graphic display system (GDS) layout produced by computerized conversion of one or more images of an IC device is one example of a synthetic output. Similarly, an image that is generated from a GDS or other data file is a synthetic image, in contrast to a true image that is produced by recording the image with an imaging device (ID).

As used herein, the term "Device Under Test (DUT)" refers to an IC device that is being inspected using a system or method consistent with the present disclosure.

The term "target design" is used herein to refer to the intended design of an IC device, i.e., the DUT, or a portion of an IC (i.e., the IC design intended by the designer). In contrast, the term "part design" refers to the detected design of an actual IC device, i.e., the DUT.

As previously noted, physical inspection of IC devices is often performed to ensure that the IC devices were faithfully produced by a manufacturer in accordance with a target design. Physical inspection is difficult and time consuming, and usually results in the destruction of the DUT under examination. Consequently, physical inspection cannot be performed on all ICs (i.e., in a batch) produced in a production run. As a result, physical inspection may not detect a modified IC device in a batch, particularly if the modified IC was not inspected. When ICs are being produced for sensitive applications such as defense applications, the limited ability of physical inspection to detect modified IC devices in a batch can be present a significant security risk.

Machine learning (ML) is an application of AI that creates systems that have the ability to automatically learn and improve from experience. ML involves the development of computer programs that can access data and learn based on that data. ML algorithms typically build mathematical models based on sample, or training, data in order to make predictions or decisions without being explicitly programmed to do so. The use of training data in ML requires human intervention for feature extraction in creating the training data set. The two main types of ML are Supervised learning and Unsupervised learning. Supervised learning uses labeled datasets that are designed to train or "supervise" algorithms into classifying data or predicting outcomes accurately. Supervised learning is typically used for problems requiring classification or regression analysis. Classification problems use an algorithm to accurately assign test data into specific categories. Regression is a method that uses an algorithm to understand the relationship between dependent and independent variables. Regression models are helpful for predicting numerical values based on different data points.

Deep learning is a sub-field of ML that automates much of the feature extraction, eliminating some of the manual human intervention required and enabling the use of larger data sets. Deep learning typically uses neural networks, which consist of layers of interconnected entities, called nodes. Each node, or artificial neuron, may have an associated activation function and has weighted connections to other nodes. A node multiplies the input data with the weight, which either amplifies or dampens that input, thereby assigning significance to inputs with regard to the task the algorithm is trying to learn. The output of any individual node is calculated using its activation function, which determines the data to the next layer of the network. A neural network that consists of more than three layers can be considered a deep learning algorithm or a deep neural network.

A convolutional neural network is a feed-forward neural network that is often used to analyze visual images by processing data with a constrained topology that creates a series of filters of increasing field size. A convolutional neural network is used to detect and classify objects in an image. In image processing, a convolutional neural network takes in an input image, assigns importance (i.e., learnable weights and biases) to various objects of the image and differentiates the objects from one another based on the weights.

With the foregoing in mind, the present disclosure relates to systems and methods for inspecting IC devices. As will be described in detail, the systems and methods utilize machine learning and images of a DUT to produce synthetic representations of the IC design implemented in the DUT (i.e., the part design). In some embodiments, the systems and methods described herein can produce a first synthetic representation of part design based at least in part on images of the top and bottom of the DUT and a MIM that was trained to correlate the target design to synthetic images of the target design. In some embodiments the MIM is implemented using convolutional neural networks to perform the inference.

For example, the MIM may perform image analysis operations on the images of the DUT to determine which observable features are present in the part design. Such observable features may include at least the presence (or absence) of material at coordinates corresponding to coordinates in the target design. Based on that image analysis the MIM may produce a first synthetic representation (REP1) of the part design, where REP1 depicts the coordinates of the part design (e.g., mapped to corresponding coordinates of the target design) with a material confidence indicator that indicates a degree to which the model believes that material is present in the DUT on a coordinate by coordinate (e.g., pixel by pixel) or region by region (group of pixels) basis. The image analysis may also determine the presence of other observable features, such as but not limited to standard cells (i.e., cells specified by a process design kit that may be specific to a particular IC manufacturing process), metal layers, vias, interconnects, combinations thereof, and the like. In such instances, REP1 may include or be updated to include such observable features and their location, e.g., alone or in combination with the confidence score(s) mentioned previously.

Following the production of REP1, the MIM may also perform one or more inference operations to infer the presence of unobserved (e.g., hidden or obscured) features in the part design. These inference operations may infer the presence of unobserved features based on various factors that may include but are not limited to the observed features, the arrangement of the observed features in REP1, contextual information associated with the observed features, or a combination thereof. In this context, "contextual information" refers to information that is implied or associated with an observed feature or a previously inferred feature. For example, contextual information may include structural features such as vias, traces, etc. that are specified for use with a standard cell or other feature, as may be specified by a process design kit for the manufacturer of the IC, design standards/conventions, the position and/or layout of observed features in the first synthetic representation, combinations thereof, and the like. In some embodiments, such contextual information may be included in a map of the target design to synthetic optical images that was used to train the MIM. In any case, the MIM may update REP1 to include the inferred features, resulting in the production of a second synthetic representation (REP2) of the part design.

In some embodiments the MIM may conduct further inference operations based at least in part on REP2 in an attempt to infer the presence of additional unobserved features. To the extent additional unobserved features are inferred, the MIM may update REP2 with the further inferred features to produce a third synthetic representation (REP3). This inference process may continue for any number (n) of rounds, with each round potentially resulting in the inference of additional unobserved features and corresponding updating of the synthetic representation of the part design.

During or after the mapping and inference process the systems and methods described herein may compare a synthetic representation of the part design to the target design and generate one or more match confidence indicators. In some embodiments, the one or more match confidence indicators are generated after the production of a synthetic representation of the part design and represent a degree of confidence as to whether the synthetic representation of the part design matches the target design, e.g., overall and/or at particular coordinates or regions of the part design and the target design. The comparison of the synthetic representation of the part design and the target design may be made in any suitable manner. For example, in some embodiments the synthetic representation of the part design may be in the form of (or converted into) production data, such as a GDS representation. In such instances, the systems and methods may compare the synthetic representation of the part design (e.g., in GDS format) to a corresponding representation of the target design. The system and methods may then assign a match confidence indicator that indicates a degree to which the model believes the part design correlates to the target design as a whole. Alternatively, or additionally, match confidence indicators may be assigned by the systems and methods described herein (e.g., by the MIM) to regions (e.g., pixels or groups of pixels) of the part design and may indicate a degree to which those regions correlate to corresponding regions of the target design.

Notably, the systems and methods described herein can enable non-destructive and automated inspection of IC devices, thus allowing all IC devices in a production run to be inspected without a need for physical deconstruction.

Figure 1:
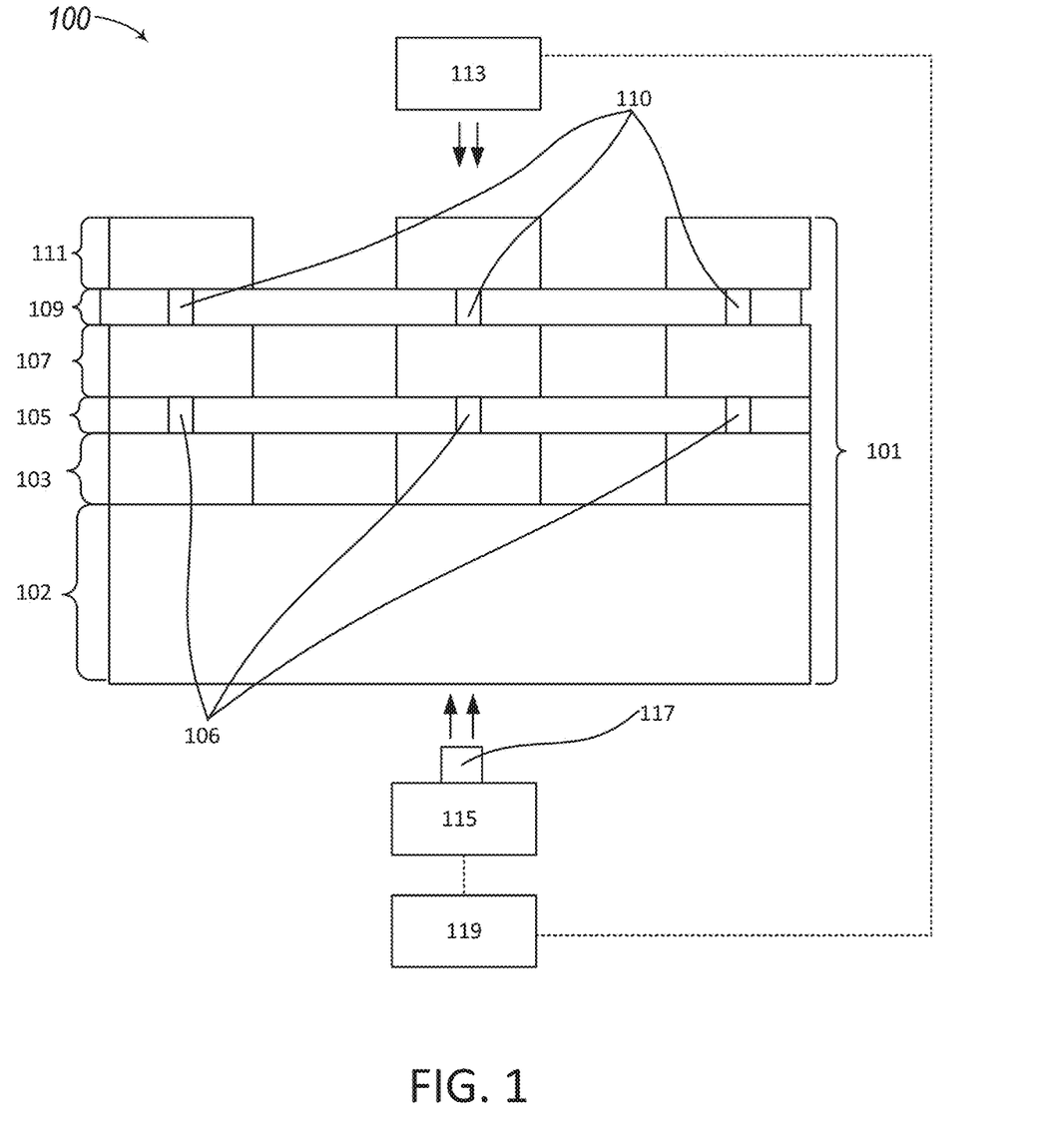
FIG. 1 is a block diagram of one example of a system for inspecting IC devices, consistent with the present disclosure.

FIG. 1 is a block diagram depicting one example of a system for inspecting ICs consistent with the present disclosure. For the sake of illustration system 100 is depicted in the context of inspection of an IC 101 that includes a substrate 102, first layer 103, second layer 105, interconnects 106, third layer 107, fourth layer 109, interconnects 110, and fifth layer 111. In this example second layer 105 and fourth layer 109 are via layers that include interconnects 106 and interconnects 110, respectively, and first layer 103, third layer 107, and fifth layer 111 are wire layers. The nature and construction of IC 101 is for the sake of example only, and the systems described herein may be used to inspect ICs with different structures.

As further shown in FIG. 1 system 100 includes a first imaging device (ID) 113, a second ID 115, and a controller 119 that is communicatively coupled to the first ID 113 and second ID 115. First ID 113 and second ID 115 are generally configured to capture images of one or more sides of IC 101. For example, first ID 113 may be configured to capture one or more images of a top side of IC 101, and second ID 115 may be configured to capture one or more images of a bottom side of IC 101. The nature and configuration of ID 113 and ID 115 is not limited, provided that they can capture images of the top and bottom of IC 101. The IDs described herein may be configured to capture any type of image that can provide at least partial information about surface features and buried (subsurface) features of a DUT under consideration. Non-limiting examples of such images include optical images, scanning electron microscope (SEM) images, x-ray images, combinations thereof, and the like. Accordingly, the IDs described herein may be in the form of an optical imaging device such as an optical camera (e.g., a visible light, ultraviolet light, and/or infrared camera), a scanning electron microscope, an x-ray machine, combinations thereof, and the like.

While FIG. 1 depicts system 100 as including two IDs, the systems described herein may be configured differently. For example, the systems described herein may include any suitable number of IDs, such as but not limited to 1, 2, 3, 4, 5, or even 6 or more IDs. When a single ID is used, it may be mounted on a repositionable gantry or other movable device such that it can be repositioned to take images of the top and bottom of IC 101. Alternatively, the single ID may be stationary system 100 may include a system for rotating or otherwise repositioning IC 101 such that the ID can image the top and bottom of IC 101. Still further, in some embodiments the single ID may be stationery and system 100 may include optics (e.g., mirrors) that enable the single ID to image the top and bottom of IC 101. In instances where multiple IDs are used, they may be arranged above and below IC 101 such that at least one ID can image the top of IC 101 and at least one ID can image the bottom of ID 101, e.g., as shown in FIG. 1.

During the production of ICs such as IC 101, a wafer is processed to form one or a plurality of layers on the surface of the substrate. As processing continues, layers are formed on top of each other, with each layer containing one or more features of the IC design. Such features may include transistors, metal layers, vias, interconnects, etc. For example, in the embodiment of FIG. 1 first layer 103 includes a plurality of wires, second layer 105 includes vias with interconnects 106, third layer 107 includes a plurality of wires, fourth layer 109 includes vias with interconnects 110, and fifth layer 111 includes a plurality of wires. With that in mind, prior to packaging many of the layers of an IC are transparent to light in certain regions of the spectrum, such as visible light, infrared light, and/or ultraviolet light. Consequently, information about at least some of the layers of an IC can be captured in an image (e.g., an optical, SEM, and/or X-ray image) of the top and/or bottom of the IC prior to packaging.

More specifically, information about one or more top side layers of an IC may be captured by an ID in an image of the top side of the IC, and information about one or more bottom side layers of the IC can be captured by an ID in an image of the bottom side of the IC. Because the top side of an IC (prior to packaging) generally includes a plurality of very thin layers, information about one or more of the top side layers of the IC may be captured by simply imaging the top side of the IC with an ID. For example, top side images captured by ID 113 in system 100 may provide information about upper layers in IC 101 (e.g., fourth layer 109 and fifth layer 111). The top side images may provide limited or no information about lower (layers in IC 101 (e.g., first layer 103, second layer 105, and third layer 107), however, as the features of such layers may be obscured by the features of fourth layer 109 and fifth layer 111.

In a similar manner, bottom side images captured by ID 115 in system 100 can provide information about lower layers in IC 101, such as first layer 103 and second layer 105. However, the bottom side images may provide limited or no information about higher layers in IC 101 (e.g., third, fourth, and fifth layers 107, 109, 111) because the features of such may be obscured by features of first layer 103 and second layer 105.

In instances where the substrate of the IC device is relatively thin and/or sufficiently transparent to the imaging device being applied, imaging of the bottom side of the substrate may provide sufficient information about lower layers in the IC simply by taking an image with an ID through the substrate. When the substrate is relatively thick and/or insufficiently transparent, however, features of the layers of the IC may be obscured by the substrate. For example, in the embodiment of FIG. 1, IC 101 includes a relatively thick substrate 102, upon which other layers of IC 101 are formed. Due to its thickness and/or other properties, substrate 102 may limit or prevent direct imaging of the lower layers of IC 101 with ID 115. To address that issue, the systems described herein may include or leverage one or more optical elements that facilitate imaging of one or more of the lower layers of an IC, even when a relatively thick substrate is present. For example, a lens such as a solid immersion lens may be used to facilitate imaging substrate 102. When used, a solid immersion lens can provide higher resolving power at longer wavelengths. For example, when ID 115 is an optical camera, substrate 102 is silicon, and optical element 117 is a solid immersion lens, the solid immersion lens may provide higher resolving power (relative to ID 115 alone). This concept is illustrated in the embodiment of FIG. 1, which depicts ID 115 as including or being coupled to a lens 117 (e.g., a solid immersion lens) formed within substrate 102, through which ID 115 may record an image of one or more lower layers of IC 101. Of course, lens 117 is not limited to a solid immersion lens and may be configured differently. Non-limiting examples of other types of lens that may be used as lens 117 include meta lens structures and other optical elements that can increase the resolving power of ID 115.

The systems described herein further include a controller, such as controller 119 in FIG. 1. In general, the controllers described herein are configured to receive one or more optical images (e.g., top side images and bottom side images) of a DUT (e.g., IC 101) from one or more IDs, and to perform IC inspection operations consistent with the present disclosure based at least in part on those optical images. As will be described in detail layer, such IC inspection operations may include applying a MIM to detect observed features in the optical image(s) of the DUT and produce a first synthetic representation (REP1) of the part design of the DUT that includes the observed features. As discussed below, the MIM may be trained with a map of synthetic optical images to synthetic production data (e.g., in GDS format).

The IC inspection operations may further include inferring the presence of first inferred features, e.g., based at least in part on REP1, the observed features in the optical image(s), and/or contextual information. A second synthetic representation (REP2) of the part design may then be produced, wherein REP2 includes the observed features and the first inferred features. The IC inspection operations may include additional inference operations to detect further inferred features and produce a further updated synthetic representation of the part design. For example, the IC inspection operations may further include inferring second inferred features of the design of the DUT based at least in part REP2 (alone or in combination with REP1), the observed features in the optical image(s), contextual information, or a combination thereof, and producing a third synthetic representation (REP 3) of the part design that includes the observed features, the first inferred features, and the second inferred features. Additional n inference operations may be performed (e.g., iteratively, or sequentially) to infer additional features based at least in part on one or more previously generated synthetic representations, previously observed features, and/or previously inferred features, resulting in the production of additional n synthetic representations of the part design of the DUT.

During the production of REP1 the MIM may analyze one or more input images of a DUT to determine whether the DUT includes material at coordinates corresponding to coordinates of the target design. For example, the MIM may determine, on a pixel by pixel or region by region basis, whether material is present at coordinates or regions of the target design based at least in part on the input image(s). The MIM may then assign, as part of REP1, material confidence indicators to each coordinate or group of coordinates, wherein the material confidence indicator indicates a degree to which the MIM believes that material is present at such coordinates.

The MIM may leverage those material confidence indicators to perform inference operations concerning unobserved features of the part design. For example, when confidence indicators indicate that there is a high probability that material is present at a particular location in the part design, i.e., the probability is above a predetermined threshold, the MIM may use the map to identify contextual information associated with that location in the target design and update the synthetic representation of the part design based on the contextual information. For example, the map used to train the MIM may include a GDS or other representation of the target design, wherein coordinates or regions of the target design are labeled or otherwise associated contextual information for those coordinates or regions. For example, the map may include contextual information indicating that material at point XYZ in the target design is a particular material, such as metal, copper, aluminum, polysilicon, or the like. Alternatively, the contextual information may be provided in a process design kit for a fabrication facility, and/or from manual inspection of cross sections of example ICs. In any case if the MIM determines that there is a high likelihood that a particular material is present at point XYZ in the synthetic representation of the part design, the MIM may infer that the material at point XYZ in the synthetic representation of the part design is that material. Similar operations may be performed to infer other information about the part design using the material confidence indicators.

Controller 119 or the MIM may also generate or assign one or more match confidence indicators that are indicative of a degree of confidence with which all or a portion of a synthetic representation of the design of the DUT corresponds to a target design for the IC. In some embodiments, the MIM may be implemented on controller 119. In other embodiments, the MIM may be separate from the controller 119, for example, the MIM may be implemented in a cluster of Graphics Processing Units (GPUs). In some embodiments the controller/MIM generates the match confidence indicator based on a comparison of a synthetic representation of the part design to the target design of the IC as a whole. Alternatively, or additionally, the controller or MIM may generate or assign match confidence indicators to regions or pixels of a synthetic representation of the DUT, e.g., based upon a comparison of the synthetic representation of each region or pixel of the DUT to corresponding regions of the target design. In some embodiments, the comparison of the synthetic representation of the DUT and the target design are performed in the design space. That is, the synthetic representation of the part design may be in a GDS or other suitable format and may be compared to a representation of the target design in the same format.

Figure 2:
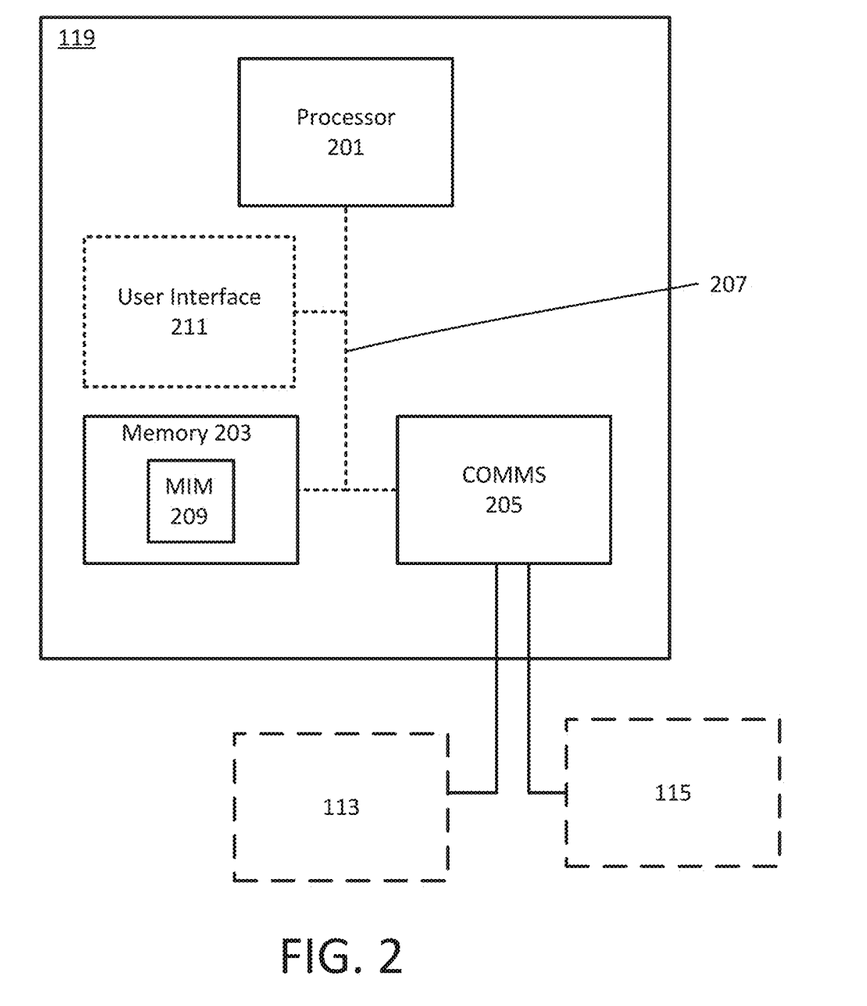
FIG. 2 is a block diagram of one example of a controller consistent with the present disclosure.

Reference is now made to FIG. 2, which is a block diagram illustrating one example of a controller 119 that may be used in accordance with the present disclosure. As shown, controller 119 includes a processor 201, memory 203, communications circuitry (COMMS) 205, and an optional user interface 211. Such components may be communicatively coupled to one another via a bus 207.

Processor 201 may be any suitable general-purpose processor or Application Specific Integrated Circuit (ASIC). Processor 201 may be, for example, one or more single or multicore processors produced by INTEL® corporation, APPLE® corporation, AMD® corporation, SAMSUNG® corporation, NVIDIA® corporation, Advanced RISC Machines (ARM®) corporation, combinations thereof, or the like. While FIG. 2 depicts the use of a single processor 201, it should be understood that multiple processors can be used.

Memory 203 may be any suitable type of computer readable memory. Examples of memory types that may be used as memory 203 include but are not limited to: programmable memory, non-volatile memory, read-only memory, electronically programmable memory, random access memory, flash memory (which may include, for example NAND or NOR type memory structures), magnetic disk memory, optical disk memory, phase change memory, memristor memory technology, spin torque transfer memory, combinations thereof, and the like. Additionally, or alternatively, memory 203 may include other and/or later-developed types of computer-readable memory.

COMMS 205 may include hardware (i.e., circuitry), software, or a combination of hardware and software that is configured to allow controller 119 to transmit and receive messages via wired and/or wireless communication to/from one or more devices, such as but not limited to first ID 113 and second ID 115. Communication between COMMS 205, first ID 113 and second ID 115 may occur, for example, via a wired or wireless connection using one or more currently known or future developed communication standards. COMMS 205 may include hardware to support such communication, e.g., one or more transponders, antennas, BLUETOOTH™ chips, personal area network chips, near field communication chips, wired and/or wireless network interface circuitry, combinations thereof, and the like.

Optional user interface 211, when used, is configured to provide a mechanism for a user to interact with and configure controller 119 and/or one or more components thereof. Any suitable user interface may be used as user interface 211. For example, user interface 211 may be or include a mechanical user interface, a graphical user interface, or a combination thereof.

Controller 119 further includes a MIM module 209. In this specific context, the term "module" refers to software, firmware, circuitry, and/or combinations thereof that is/are configured to perform or cause the performance of one or more operations consistent with the present disclosure.

Software may be embodied as a software package, code, instructions, instruction sets and/or data recorded on non-transitory computer readable storage media. Firmware may be embodied as code, instructions or instruction sets and/or data that are hard-coded (e.g., nonvolatile) in controller 119, e.g., within memory 203 (as shown in FIG. 2) or other computer readable storage. In some embodiments, MIM 209 is in the form of logic that is implemented at least in part in hardware to perform IC inspection operations consistent with the present disclosure. For example, MIM 209 may be in the form of computer readable instructions which when executed by processor 201 cause controller 119 to perform IC inspection operations consistent with the present disclosure, such as but not limited to the operations of the map generation/training and IC inspection methods described herein.

As noted above the technologies of the present disclosure utilize a mapping and inference model to inspect an IC based on one or more images of a DUT as an input. In general, the MIM module is trained with a map of a target design for the DUT, such that it can (e.g., with a first detection model (or first set of detection models)) enable the detection of observable features from the input optical image(s), and the production of a first synthetic representation (REP1) of the part design of the DUT. For example, the MIM may apply one or more models to detect the presence of standard cells (e.g., cells defined by a process design kit of a manufacturer), vias, and/or metal layers based at least in part on the optical images, the map, or a combination thereof. The MIM may then include such features (i.e., detected standard cells, vias, metal layers, etc.) in REP1.

While the image(s) may provide information that allows the detection of features that are present in upper or lower layers of the part design, some features of the part design (e.g., in middle layers) may be obscured. Thus, REP1 may only be a partial representation of the part design. For example, REP1 may indicate the presence of one or more standard cells in one or more layers of the part design but may not include the connectivity between such components and/or with other layers or features of the part design. With that in mind, the MIM can utilize one or more inference models to infer the presence of additional features, e.g., based at least in part on the map, REP1, and/or contextual information.

For example, the MIM may be aware of contextual information associated with the target design, e.g., by virtue of its training with a map of the target design (in a production GDS) or design (e.g., Register Transfer Level (RTL)) format and synthetic optical images of the target design. That contextual information may associate connectivity (e.g., vias, metal layers, traces, etc.) and/or other features that are specified by a process design kit for use with an observed or otherwise detected feature, such as a standard cell. In such instance, the MIM may infer the presence of such connectivity and/or other features based on the presence of the observed or otherwise detected feature. For example, when a standard cell is detected in the part design, the MIM may infer connectivity associated with that standard cell based on contextual information for the standard cell contained in the map that was used to train the MIM.

Similarly, the MIM may infer connectivity between layers of a part design based on contextual information associated with detected geometry of vias, traces, etc. in the DUT. For example, when a via is detected in a layer of DUT at a particular location of the part design, the MIM may compare the position of the detected via to a corresponding location in the map of the target design that was used to train the MIM. If the map of the target design includes a via at that location, the MIM may infer connectivity to that detected via that is specified in the map of the target design. Similar operations may be carried out to infer other features in the part design, e.g., based on detected standard cells, geometric relationships between detected features (vias, metal layers, etc.) and corresponding portions of a map of the target design used to train the MIM, positional relationships between detected and/or inferred features, design parameters specified by a process design kit for the manufacturing facility that produced the DUT, etc.

In any case, the MIM may produce updated synthetic representations of the part design, wherein the updated synthetic representations include observed features and inferred features. For example, the MIM may perform first inference operations (e.g., based upon REP1, the optical image(s), and/or the map) to infer the presence of first inferred features, and to update REP1 to produce a second synthetic representation (REP2) of the part design that includes the first inferred features. The MIM may then perform second inference operations (e.g., based on REP1, REP2, the optical image(s), and/or the map) to produce a third synthetic representation (REP3) of the part design. This process can continue with additional inference operations being performed for n rounds to produce n synthetic representations of the part design. At any point in this process, the MIM may compare all or a portion of a synthetic representation of the part design to all or a corresponding portion of a target design and produce a match confidence indicator that indicates the degree to which the part design or portion thereof corresponds to the target design, or a corresponding portion thereof as discussed above.

Figure 3:
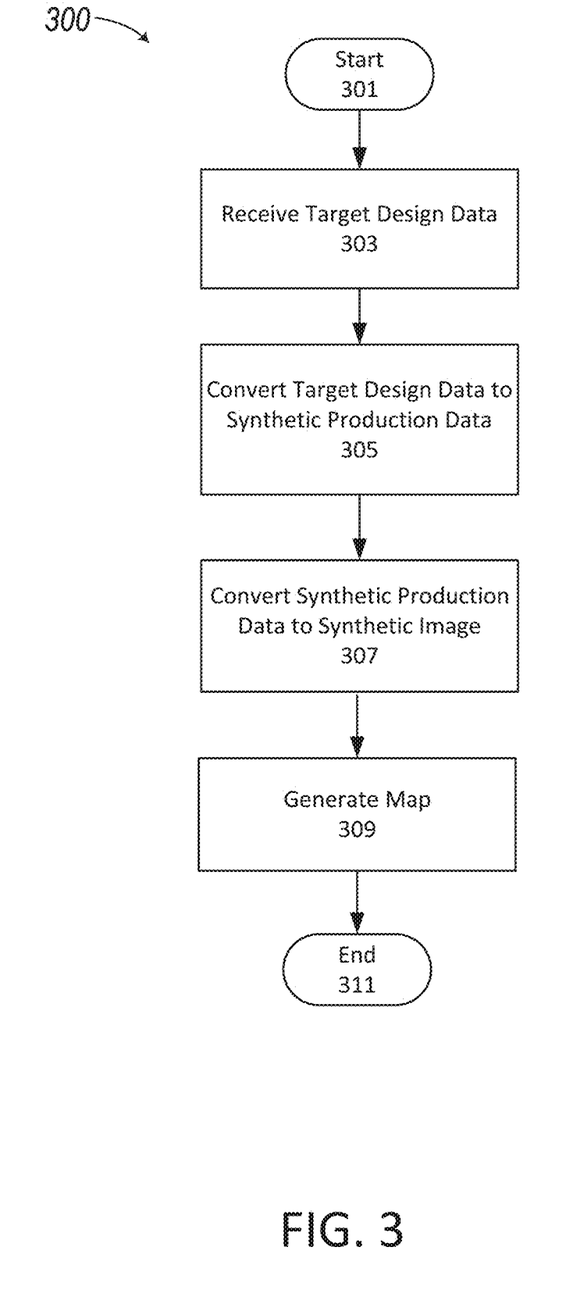
FIG. 3 is a flow diagram of example operations of a method of training a mapping and inference model (MIM) consistent with the present disclosure.

FIG. 3 is a flow diagram depicting operations for a method of training a mapping and inference model, in accordance with an embodiment of the present disclosure. However, FIG. 3 provides only an illustration of one implementation and does not imply any limitations with regard to the environments in which different embodiments may be implemented. Many modifications to the depicted environment may be made by those skilled in the art without departing from the scope of the disclosure as recited by the claims. For convenience and case of understanding the following discussion will proceed based on an example in which a mapping and inference (MIM) model is trained based on optical images of a DUT, but it should be understood that such training may be performed using other types of images (e.g., SEM, X-ray, etc.) and combinations of such image types.

As shown, method 300 begins at block 301. The method then proceeds to block 303, pursuant to which target design data is received. As used herein, "target design data" refers to computer data of the target design of an IC. The target design data may be provided in any suitable format but is preferably provided in the form of one or more computer files that present the target design in RTL format. Of course, use of RTL format is not required, and any suitable format may be used for the target design data.

Following the operations of block 303, the method then proceeds to block 305. Pursuant to block 305 the target design data is converted to synthetic production data. As used herein, "synthetic production data" means computer data that is in a format that is suitable for use by a manufacturer for the physical production of an IC. Without limitation, synthetic production data may be in the form of one or more graphic display system II (GDSII) stream files, i.e., the data file format commonly used in industry for data exchange of ICs and/or IC artwork. In some embodiments, the synthetic production data is in the form of one of more GDS files that are in a binary file format represents planar geometric shapes (e.g., IC layers), text labels, and other information about the target design in a hierarchical form. The synthetic production data may also include graphic representations (e.g., polygons) of the target design, which may be arranged to (e.g., visually) represent layers of the target design.

The conversion of target design data to synthetic production data may be performed in any suitable manner. For example, target design data may be converted to production data using software that implements process design kit rules for a manufacturing facility and place and route rules to convert target design data (e.g., RTL) to production data (e.g., GDS). This may be performed in any suitable manner, such as via the opensource OpenLane tool flow with the opensource SkyWater process design kit. Notably in this process the synthetic production data may be appended with the target design data, thus mapping features of the synthetic production data to features of the target design data. The synthetic production data may also be appended with contextual information, e.g., based upon conditions imposed by the relevant process design kit, design conventions, material specifications, and the like. As noted above, the contextual data may include identification of material for use at a location in the target design, the feature(s) (e.g., transistors, vias, traces, standard cells, etc.) present at locations in the target design, combinations thereof, and the like. As such, the synthetic production data may include contextual information that is associated with locations (e.g., specific coordinates, regions, etc.) of the target design.

The method then proceeds to block 307, pursuant to which the synthetic production data is converted to one or more synthetic optical images of the target design. In some embodiments, the operations of block 307 include producing synthetic optical images of a top side of the target design and a bottom side of the target design, but the present disclosure is not limited thereto, and any suitable number of synthetic optical images may be produced.

The manner in which a synthetic optical image of the target design is produced is not limited. In some embodiments, the production of a synthetic optical image of the target design may include converting polygons or other representations of elements of the target design in the synthetic production data to raster maps. This may be accomplished in any suitable manner. For example, when synthetic production data is or includes one or more GDS files that include or describe polygons representing one or more layers of the target design, such polygons may be converted to raster maps using KLayout (a visualization tool for IC designs, described at https://www.klayout.de/doc.html as of the date of this application) or another suitable program. The output may be a stack of raster maps that show the location of material from each layer of the target design. This is similar to the segmentation maps created by semantic segmentation where multiple classes can be active at each special location, rather than a single hot coded pixel. That is, the conversion of the synthetic production data to raster maps may be performed by aligning each of N layers of the design polygons on an N layer grid, wherein each position of the grid is either high or low depending on the presence or absence of a design polygon at the layer/location pair.

The raster maps may then be used as an input to another model, which converts the raster maps to one or more synthetic optical images of the target design. Any model that can accept an image-based input, such as a raster map, and produce an image-based output, such as a synthetic optical image, may be used for this purpose. For example, the raster maps may be input to a conditional generative adversarial network (CGAN) model that includes an image generator and a discriminator model. The image generator may be configured to generate test synthetic optical images of the target design based on the raster maps. Once a test synthetic optical image is produced it may be evaluated by the discriminator model that is trained to determine whether a test synthetic optical image produced by the image generator is a real image or not. In some embodiments the discriminator model may perform its function based at least in part on the use of optical images of an IC with a known good design as a reference image or ground truth. For example, the discriminator model may compare pairs of raster maps and optical images and attempt to distinguish between true and synthetic optical images.

If the discriminator model determines that a test synthetic optical image is not a real image (e.g., the test synthetic optical image does not sufficiently match a reference image), the image generator may adjust its parameters and produce another test synthetic optical image for evaluation by the discriminator model. This process may continue until the discriminator model determines that a test optical image is a real image or is sufficiently close to a real image (e.g., the test synthetic optical image sufficiently matches a reference image). At that point, the test synthetic optical image is a synthetic optical image of the target design. Once synthetic optical images of the desired sides of the target design have been produced (e.g., a synthetic top image and a synthetic bottom image), the method may proceed from block 307 to block 309.

As noted above any suitable image to image model may be used to perform the operations of block 307. One example of a suitable CGAN model that may be used to perform such operations is the pix2pix CGAN model, which is described in Isola et al., "Image to Image Translation with Conditional Adversarial Networks," Berkely AI Research BAIR Laboratory, UC Berkeley, available at https://arxiv.org/pdf/1611.07004.pdf. Other examples of suitable models that may be used to produce synthetic images of a target design include the models provided at https://paperswithcode.com/task/image-to-image-translation as of the date of filing of this application, in particular the OASIS (open affective standardized image set) and U-GAT-IT (un-supervised generative attentional networks with adaptive layer instance normalization for image to image translation) models. Additional models that may be used for this purpose including the model described in "A Style-Based Generator Architecture for Generative Adversarial Networks," Karras et. al. (available at https://arxiv.org/pdf/1812.04948.pdf as of the filing date of this application), and "UU-Nets Connecting Discriminator and Generator for Image-to-Image Translation" Wu Jionghao (available at https://arxiv.org/pdf/1904.02675.pdf as of the filing date of this application).

Pursuant to block 309, a map may be generated between the synthetic optical image(s) of the target design, the synthetic production data of the target design, and optionally the target design data. In some embodiments, the map includes a coordinate by coordinate and/or region by region mapping of coordinates or regions of the synthetic optical image to corresponding coordinates or regions of the synthetic production data, and optionally with the target design data. In some embodiments, the map may be in the form of, or include a lookup table or other database that associates coordinates of a synthetic optical image of the target design with corresponding coordinates of synthetic production data of the target design, and optionally with corresponding features of the target design data. In some embodiments the map includes contextual information, which may be appended to, or associated with, features of the synthetic optical image, synthetic production data, and/or target design data. As noted previously, the contextual information may identify the material at a particular location of the design, connectivity associated with a feature (e.g., a standard block, via, trace, etc.) at a particular location in the design, combinations thereof, and the like. The contextual information may also include material specifications, connectivity, etc. specified by the target design data, a process design kit for the manufacturing facility or process that will be used to produce the target design, design conventions, combinations thereof, and the like.

Once the map has been established, the method may proceed from block 309 to block 311 and end. At that point, the map may be used to train a MIM, such that the MIM can be used to inspect ICs based at least in part on (true) optical images of a DUT.

Figure 4:
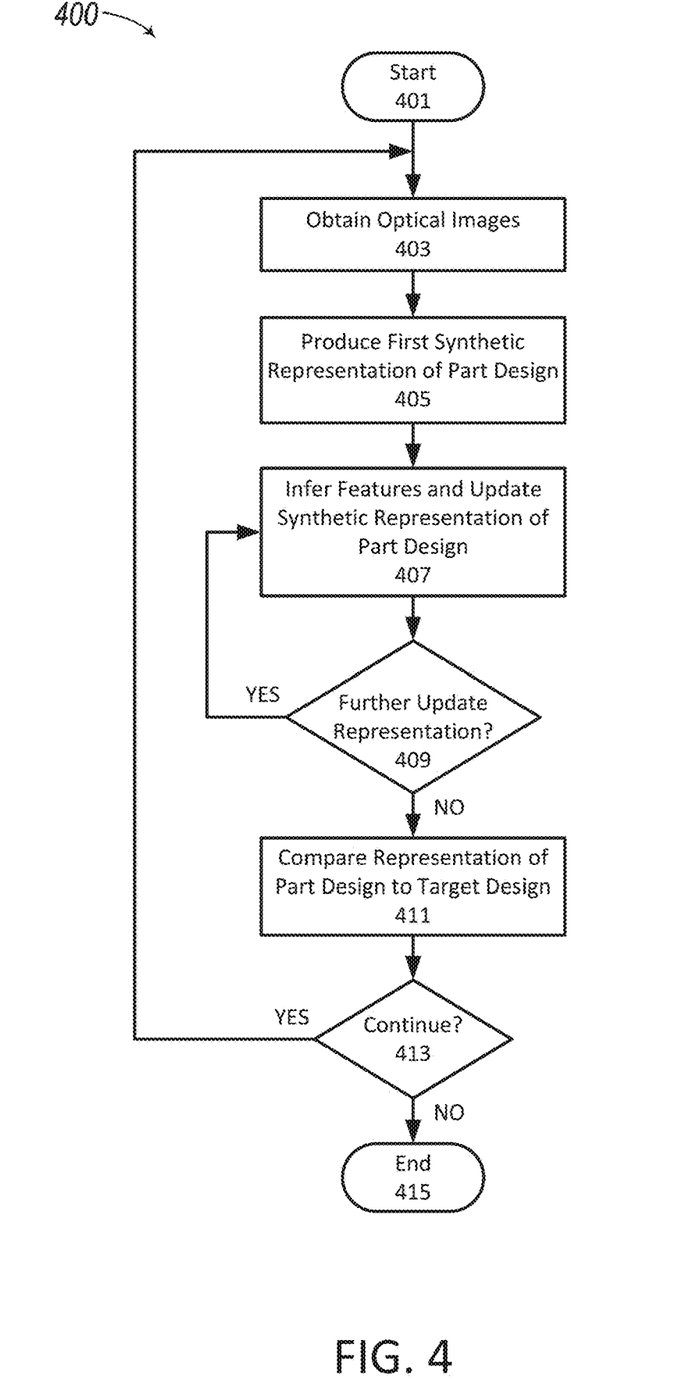
FIG. 4 is a flow diagram of example operations of one example of a method of inspecting an IC device using a MIM consistent with the present disclosure.

FIG. 4 is a flow diagram depicting operations for a method of inspecting an IC device using a MIM, in accordance with an embodiment of the present disclosure. However, FIG. 4 provides only an illustration of one implementation and does not imply any limitations with regard to the environments in which different embodiments may be implemented. Many modifications to the depicted environment may be made by those skilled in the art without departing from the scope of the disclosure as recited by the claims. Like FIG. 3, the method of FIG. 4 is described in the context of an example in which a DUT is inspected based on optical images, but it should be understood that other images may also be used depending on the manner in which the MIM applied by the method of FIG. 4 was trained.

Method 400 assumes that the MIM has already been trained as shown, for example, in the flow diagram of FIG. 3 above.

In block 403, one or more optical images of the DUT are obtained. As discussed above, images of the DUT may be obtained using an optical imaging device such as a camera. In some embodiments, a first ID may be used to obtain a top side optical image of the top side of the DUT, and a second ID may be used to obtain a bottom side optical image of the bottom side of the DUT. In instances where the DUT has a relatively opaque substrate, the optical image of the side of the DUT bearing the substrate may be obtained with or through an optical element such as a lens (e.g., a solid immersion lens) that enables imaging of one or more layers of the IC proximate the substrate, as discussed above.

The method then proceeds to block 405, pursuant to which a first synthetic representation (REP1) of the part design (i.e., the design of the DUT) is produced. In general, the operations of block 405 involve utilizing the optical images of the DUT as an input to the MIM and performing image analysis operations with the MIM to identify observable features from at least the optical images. Non-limiting examples of observable features that may be identified include the presence or absence of material (e.g., polysilicon, metal, dopant, etc.) at a particular location, the presence of a standard cell (e.g., a cell with parameters specified by a process design kit established for the manufacturing facility or process constructing the DUT), vias, trenches, metal layers, traces, combinations thereof, and the like. Following such image analysis operations, the MIM may produce REP1, wherein REP1 includes at least a portion of the observed features. Inference operations may then be performed by the MIM to produce additional synthetic representations of the part design, as discussed later in connection with blocks 407 and 409.

By way of example, in some embodiments the MIM may perform image analysis operations on the (real) images of the DUT to determine the presence or absence of material at coordinates. In some embodiments, the image analysis operations may include parsing the input images into tiles and analyzing pixels within the tiles using a semantic segmentation model to estimate whether there is material at the coordinate of each pixel, or not. In some embodiments the semantic segmentation model may represent the degree to which the model believes that material is present with a material confidence indicator for each pixel or group of pixels that were examined. One non-limiting example of a suitable semantic segmentation model that may be employed for this purpose is the U-Net semantic segmentation architecture, but other semantic segmentation models may also be used. In some embodiments, the semantic segmentation model is configured to use top and bottom optical images of the DUT, and to parse those images into a multilayer input, after which the input may be analyzed to determine whether material is present or not at each pixel, along with a confidence indicator for each pixel or group of pixels. The semantic segmentation model may map coordinates for each pixel back to the target design using the map, and produce REP1, wherein REP1 associates (graphically or otherwise) coordinates of the part design with confidence indicators signifying the degree to which the model believes that material is present at those coordinates. In some embodiments REP1 is a matrix where each value represents a confidence that a material is present at each x, y coordinate of each layer in the target design.

The image analysis operations may also include operations that detect the presence of other structural features in the part design based at least in part on the top and bottom optical images. Such structural features include but are not limited to standard cells, vias, traces, trenches, metal layers, interconnects, combinations thereof, and the like. The manner in which the MIM detects such features is not limited, and any suitable method may be used. In some embodiments, the MIM may perform box detection operations on the top and bottom optical images in order to detect standard cells in the part design. The box detection operations may be performed using a single or multi-box detection architecture that has been trained based on standard cells that are included in a process design kit for the manufacturing facility that manufactured the DUT. In some embodiments, the MIM may utilize a multibox detector that hypothesizes the standard cells that could be in the top and bottom optical images, performs a classification analysis on the top and bottom images for the hypothesized standard cells, and performs a localization analysis for each of the hypothesized standard cells on the top and bottom images. Detected standardized cells may then be included as observed features the in the first synthetic representation REP1 of the part design.

Image analysis operations may also be performed to detect vias that connect between layers and metal layers for estimating metal layers. Such detection may be performed in substantially the same manner as the image analysis operations described above for the detection of the material presence, e.g., using a U-Net architecture. Detected vias and/or metal layers may be included as observed features in REP1.

During or after the production of REP1, the method proceeds to block 407, wherein the MIM performs inference operations to infer the presence of unobserved features in the part design and update the synthetic representation of the part design. As discussed above, optical images of a DUT may be used to detect at least some features that are present in upper or lower levels of the part design. However, some features of the part design may not be observable from the optical images. As a result, REP1 may only be a partial representation of the design of the DUT, e.g., a representation of only the observable features that were determined from the optical images. For example, REP1 may indicate the presence of material at specific locations, the presence of one or more standard cells in one or more layers, the presence of one more vias, etc. but it may lack some or all of the connectivity between such components and/or with other layers/features of the part design. With that in mind, pursuant to block 407 the MIM can utilize one or more inference models to infer the presence of additional features, e.g., based at least in part on the map, REP1, and/or contextual information.

For example, in an initial round the MIM may perform first inference operations that may infer the presence of first inferred features based on contextual information associated with the target design, e.g., by virtue of its training with a map of the target design and/or similar target designs using the same process design kit (in a production or design format) and synthetic optical images of the target design and/or similar target designs using the same process design kit. For example, the map used to train the MIM may associate contextual information that associates connectivity (e.g., vias, metal layers, traces, etc.) and/or other features that are specified by a process design kit for use with an observed or otherwise detected feature, such as a standard cell. In such cases and as discussed previously the MIM may infer the presence of such connectivity and/or other features based on the presence of the observed or otherwise detected feature. For example, when a standard cell is detected in the part design, the MIM may infer connectivity associated with that standard cell based on contextual information for the standard cell contained in the map applied by the MIM. Similarly, the MIM may infer connectivity between layers of a part design based on contextual information associated with detected geometry of vias, traces, etc. in the DUT as discussed above. Similar operations may be carried out to infer other features in the part design, e.g., based on detected standard cells, geometric relationships between detected features (vias, metal layers, etc.) and corresponding portions of a map of the target design, positional relationships between detected and/or inferred features, and design parameters specified by a process design kit for the manufacturing facility that produced the DUT, etc.

During this process, the MIM may produce updated synthetic representations (e.g., REP2, REP3, etc.) of the part design, wherein the updated synthetic representations include the observed features (in REP1) and features that were inferred based on contextual or other information. Following an update of the synthetic representation the method proceeds to block 409, pursuant to which a determination is made as to whether the synthetic representation of the DUT is to be further updated. If the outcome of block 409 is yes the method loops back to block 407, pursuant to which additional (e.g., second, third, $n^{th}$) inference operations can be performed to infer additional (second, third, $n^{th}$) inferred features in the part design, e.g., based on previously generated synthetic representations of the part design (e.g. REP1, REP2, etc.), the observed features, previously inferred features, the arrangement of the inferred and/or observed features, combinations thereof, and the like. In some embodiments, additional features which may be inferred by the additional inference operations include connectivity between previously observed and/or inferred features of the target design.

The manner in which such additional inference operations may be performed is not limited, and any suitable method of inferring the presence of additional inferred features may be used. In some embodiments, the additional inferred operations may be performed at least in part with a conditional generative adversarial network (e.g., a U-Net architecture), a recursive model, combinations thereof, and the like. In some embodiments the systems described herein analyze a DUT in three passes—a first pass for direct material detection and inference (based on observed features), second pass to infer first hidden features from the direct material detection and inference, and a third pass to infer additional features from the direct material detection and inference and the first inferred features. In any case, the MIM may produce updated synthetic representations of the part design, wherein the updated synthetic representations include observed features and inferred features.

At any point in this process, the MIM may compare all or a portion of a synthetic representation of the part design to all or a corresponding portion of a target design and produce a match confidence indicator that indicates the degree to which the part design or portion thereof corresponds to the target design, or a corresponding portion thereof as discussed above. For example in the method of FIG. 4, if the outcome of block 409 is no the method proceeds to block 411, pursuant to which the MIM compares a synthetic representation of the target design (e.g., a latest or final synthetic representation of the operations of block 407 to the target design), and produce one or more match confidence indicators that indicate a degree to which the MIM believes the synthetic representation of the part design (or portion thereof) corresponds to the synthetic representation of the target design (or corresponding portion thereof). In some embodiments, the synthetic representations of the part design are produced or converted into synthetic production data based at least in part on the map, and the synthetic production data of the part design may be compared to synthetic production data of the target design. For example, simple subtraction between the target design and the synthetic representation can be performed to detect deviations between the synthetic and target designs, with image processing techniques (blurring, filtering, etc.) used to detect false positives. Additionally, a convolutional neural network may be trained to detect algorithmically inserted design perturbations in synthetic optical imagery of a target design and then applied to assess the match confidence between the target design and (real) optical images of a DUT.

Following the operations of block 411 the method proceeds to block 413, pursuant to which a determination is made as to whether the method should continue. If so, the method loops back to block 403. But if not, the method proceeds to block 415 and end.

For the sake of clarity and to facilitate understanding the present disclosure will proceed to describe an example of the production of a map consistent with the present disclosure, and the detection of design information of a DUT from optical images of the DUT and application of a mapping and inference model.

In this example, physical delayering is performed on several IC dies, and scanning electron microscope (SEM) images are taken for each material layer of the DUTs. The SEM images are used as a ground truth for the development of an algorithm to produce synthetic optical images of the target design (i.e., the design of the die). Another die with the same design is de-packaged, and optical images of the top and bottom of that die are captured using a camera. The optical image of the top of the die is easily captured, but the removal of the substrate from the bottom of the die by chemical etching is performed to enable optical imaging of layers on the bottom side of the dic.

The SEM and optical images are divided into tiles representing different regions of the die. The tiles are stitched together to create larger image files representing each layer of the design, as well as the top and bottom three channel (red, green, and blue) optical images. The images are aligned and de-warped to ensure accurate special alignment, resulting in the production of a stack of two optical images to use as inputs to CNN models, and a stack of SEM images to use as target outputs. Those image stacks are broken back into tiles for subsequent machine learning tasks. Models are trained to fit the specific fabrication process used to produce the example die (i.e., the DUT), rather than utilize arbitrary models with fabrication process parameters.

Figure 5:
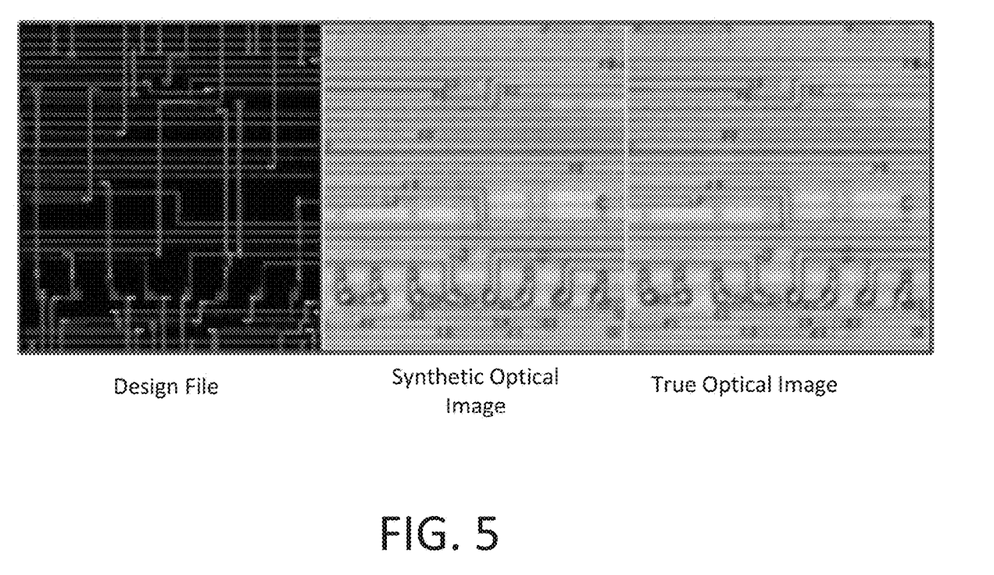
FIG. 5 depicts a design image, a synthetic optical image, and a true optical image of one example of an IC design.

A conditional generative adversarial network (CGAN) model is used to generate synthetic optical images of the target design of the DUT from a GDS representation of the target design. This is shown in FIG. 5, in which the left image is the GDS representation of the target design of the data, the right image is the true optical image of the die, and the center image is a synthetic optical image produced by the CGAN model. As can be seen by the example of FIG. 5, the CGAN model produces a synthetic optical image that is substantially similar to the true optical image of the DUT. A map is then generated between the synthetic optical image, the GDS representation of the target design, and an RTL representation of the target design. The map is appended with contextual information based on the process design kit rules for the fabrication process used to produce the example die.

The map is then used to train a MIM that was used to inspect the design of another DUT based on actual optical images of the top and bottom of the DUT. More specifically, the map was used to train a modified U-Net architecture using simultaneous binary semantic segmentation tasks for each layer. This approach allowed the MIM model to detect observed structures from the optical images of the DUT and make inferences about unobserved physical structures using the learned representations of observed structures.

Figure 6:
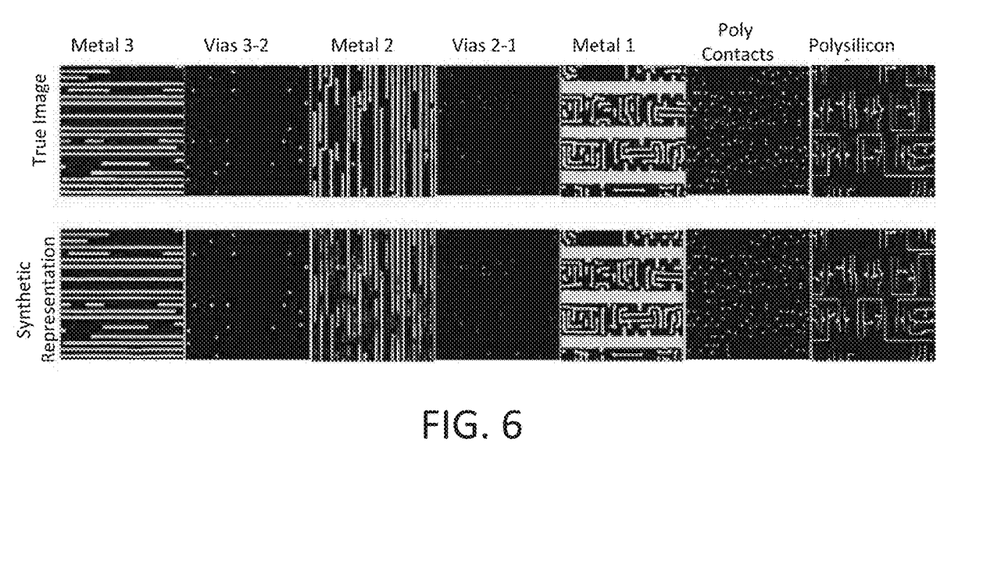
FIG. 6 depicts true design images and synthetic design images produced by an IC inspection method consistent with the present disclosure.

As one example of the performance of the MIM based on top and bottom optical images of the DUT, reference is made to FIG. 6. As can be seen in the example of FIG. 6, the MIM is capable of accurately determining the structure of several layers of the part design (e.g., metal 3, vias 3-2, metal 1, polycontacts, polysilicon). The MIM was also able to determine some of the structure of deeper layers (metal 2, vias 2-1) of the part design, but the performance is limited as the features of such layers were heavily obscured from both the top and bottom sides of the DUT.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include a computer readable storage medium (or media) having computer readable program instructions thereon for causing a processor to carry out aspects of the present disclosure.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or other programmable logic devices (PLDs) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

According to one aspect of the present disclosure, there is thus provided a computer implemented method for inspecting ICs. The computer-implemented method includes: receiving, by a controller, one or more images of a Device Under Test (DUT) from one or more imaging devices; detecting, by the controller, observed features in the one or more images and producing a first synthetic representation of a part design of the DUT that includes the observed features; inferring, by the controller, a presence of one or more first unobserved features, wherein the one or more first unobserved features are inferred using a mapping and inference model (MIM); and adding, by the controller, the one or more first unobserved features to the first synthetic representation of the part design of the DUT.

According to another aspect of the present disclosure, there is thus provided a system for inspecting ICs. The system includes: one or more controllers; one or more computer readable storage media; and program instructions stored on the one or more computer readable storage media for execution by at least one of the one or more controllers, the stored program instructions including instructions to: receive one or more images of a Device Under Test (DUT) from one or more imaging devices; detect observed features in the one or more images and producing a first synthetic representation of a part design of the DUT that includes the observed features; infer a presence of one or more first unobserved features, wherein the one or more first unobserved features are inferred using a mapping and inference model (MIM); and add the one or more first unobserved features to the first synthetic representation of the part design of the DUT.

According to yet another aspect of the present disclosure, there is thus provided an apparatus for inspecting ICs. The apparatus includes: at least one imaging device configured to capture one or more images of a Device Under Test (DUT); and a controller comprising a mapping and inference model (MIM) that is configured to cause the controller to: receive one or more images of the DUT from the one or more imaging devices; detect observed features in the one or more images of the DUT and produce a first synthetic representation of a part design of the DUT, the first synthetic representation including at least the observed features; infer a presence of one or more first unobserved features based at least in part on the first synthetic representation; and generate a second synthetic representation of the part design of the DUT by adding one or more second unobserved features to the first synthetic representation of the part design.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A computer-implemented method for inspecting ICs, the computer-implemented method comprising:
   receiving, by a controller, one or more images of a Device Under Test (DUT) from one or more imaging devices;
   detecting, by the controller, observed features in the one or more images and producing a first synthetic representation of a part design of the DUT that includes the observed features;
   inferring, by the controller, a presence of one or more first unobserved features; and
   adding, by the controller, the one or more first unobserved features to the first synthetic representation of the part design of the DUT.

2. The computer-implemented method of claim 1, further comprising:
   determining, by the controller, one or more material confidence indicators to at least a portion of the first synthetic representation of the part design of the DUT, wherein the one or more material confidence indicators are indicative of a degree to which a material is present at one or more coordinates of the part design;
   responsive to determining that any material confidence indicator of the one or more material confidence indicators is above a predetermined threshold, inferring, by the controller, the presence of one or more second unobserved features, wherein the one or more second unobserved features are inferred; and
   generating, by the controller, a second synthetic representation of the part design of the DUT by adding the one or more second unobserved features to the first synthetic representation of the part design.

3. The computer-implemented method of claim 2, further comprising:
   performing, by the controller, additional inference operations to detect further inferred features and produce additional synthetic representations of the DUT, wherein each additional inference operation incorporates results of any previous inference operations.

4. The computer-implemented method of claim 3, wherein performance of each additional inference operation is based at least in part on the observed features in the one or more images, contextual information, or a combination thereof.

5. The computer-implemented method of claim 1, wherein the one or more first unobserved features infer the presence of a standard cell in DUT, wherein the standard cell is defined by a process design kit for a fabrication process used to produce the DUT.

6. The computer-implemented method of claim 1, wherein the controller uses machine learning.

7. The computer-implemented method of claim 1, wherein the controller uses a convolutional neural network.

8. The computer-implemented method of claim 1, wherein the controller is trained using one or more test images generated using a conditional generative adversarial network.

9. A system for inspecting ICs, the system comprising:
   one or more controllers;
   one or more computer readable storage media; and
   program instructions stored on the one or more computer readable storage media for execution by at least one of the one or more controllers, the stored program instructions including instructions to:
   receive one or more images of a Device Under Test (DUT) from one or more imaging devices;
   detect observed features in the one or more images and producing a first synthetic representation of a part design of the DUT that includes the observed features;
   infer a presence of one or more first unobserved features; and
   add the one or more first unobserved features to the first synthetic representation of the part design of the DUT.

10. The system of claim 9, further comprising one or more of the following program instructions, stored on the one or more computer readable storage media, to:
   determine one or more material confidence indicators to at least a portion of the first synthetic representation of the part design of the DUT, wherein the one or more material confidence indicators are indicative of a degree to which a material is present at one or more coordinates of the part design;
   responsive to determining that any material confidence indicator of the one or more material confidence indicators is above a predetermined threshold, infer the presence of one or more second unobserved features, wherein the one or more second unobserved features are inferred; and generate a second synthetic representation of the part design of the DUT by adding the one or more second unobserved features to the first synthetic representation of the part design.

11. The system of claim 9, further comprising one or more of the following program instructions, stored on the one or more computer readable storage media, to:

perform additional inference operations to detect further inferred features and produce additional synthetic representations of the DUT, wherein each additional inference operation incorporates results of any previous inference operations.

12. The system of claim 9, wherein performance of each additional inference operation is based at least in part on the observed features in the one or more images, contextual information, or a combination thereof.

13. The system of claim 9, wherein the one or more first unobserved features infer the presence of a standard cell in the DUT, wherein the standard cell is defined by a process design kit for a fabrication process used to produce the DUT.

14. The system of claim 9, wherein the one or more controllers use machine learning.

15. The system of claim 9, wherein the one or more controllers use a convolutional neural network.

16. The system of claim 9, wherein the one or more controllers are trained using one or more test images generated using a conditional generative adversarial network.

17. An apparatus for inspecting ICs, comprising:

one or more imaging devices configured to capture one or more images of a Device Under Test (DUT); and a controller configured to:

receive the one or more images of the DUT from the one or more imaging devices;

detect observed features in the one or more images of the DUT and produce a first synthetic representation of a part design of the DUT, the first synthetic representation including at least the observed features;

infer a presence of one or more first unobserved features based at least in part on the first synthetic representation; and generate a second synthetic representation of the part design of the DUT by adding one or more second unobserved features to the first synthetic representation of the part design.

18. The apparatus of claim 17, wherein the controller is configured to detect the observed features at least in part by performing semantic segmentation on the one or more images of the DUT.

19. The apparatus of claim 17, wherein the observed features include at least one standard cell defined by a process design kit for a manufacturing process used to produce the DUT, and the controller is configured to infer the presence of the one or more first unobserved features based at least in part on the at least one standard cell.

20. The apparatus of claim 17, wherein the controller is further configured to determine the presence of material in the part design based at least in part on the one or more images of the DUT to output a material confidence indicator, wherein the material confidence indicator is indicative of a degree to which the material is present at coordinates of the part design.

* * * * *